United States Patent
Tatara et al.

(10) Patent No.: US 8,771,446 B2
(45) Date of Patent: Jul. 8, 2014

(54) BAND DETACHING METHOD IN BAND BUILDING DRUM AND BAND BUILDING DRUM

(75) Inventors: Tetsuo Tatara, Osaka (JP); Tomoyuki Takatsuka, Osaka (JP)

(73) Assignee: Toyo Tire & Rubber Co., Ltd., Osaka-shi, Osaka (JP)

( * ) Notice: Subject to any disclaimer, the term of this patent is extended or adjusted under 35 U.S.C. 154(b) by 1230 days.

(21) Appl. No.: 12/301,122

(22) PCT Filed: May 19, 2006

(86) PCT No.: PCT/JP2006/310057
§ 371 (c)(1),
(2), (4) Date: Mar. 26, 2009

(87) PCT Pub. No.: WO2007/135720
PCT Pub. Date: Nov. 29, 2007

(65) Prior Publication Data
US 2009/0229752 A1     Sep. 17, 2009

(51) Int. Cl.
*B29D 30/24* (2006.01)

(52) U.S. Cl.
CPC .............. *B29D 30/24* (2013.01); *B29D 30/242* (2013.01); *B29D 30/244* (2013.01); *B29D 30/247* (2013.01)
USPC .......................... 156/110.1; 156/417; 156/420

(58) Field of Classification Search
CPC .... B29D 30/24; B29D 30/242; B29D 30/244; B29D 30/245; B29D 30/247; B29D 2030/2657; B28B 7/30; B28B 21/88
USPC .............. 156/111, 117, 130.7, 131, 133, 344, 156/396, 397, 403, 406.4, 406.2, 405.1, 156/110, 402, 420, 414, 415, 247, 719, 767, 156/417; 249/180, 181
See application file for complete search history.

(56) References Cited

U.S. PATENT DOCUMENTS 3,644,162 A * 2/1972 Appleby et al. ............... 156/415
3,909,336 A * 9/1975 Takahashi et al. ............. 156/366
(Continued)

FOREIGN PATENT DOCUMENTS

| JP | 5-220865 A | 8/1993 |
|----|------------|--------|
| JP | 11-151763 A | 6/1999 |
| JP | 2000-899 A | 1/2000 |
| JP | 2001-219477 A | 8/2001 |
| JP | 2003-89158 A | 3/2003 |

OTHER PUBLICATIONS

Non-Final Office Action dated Feb. 24, 2012 in copending U.S. Appl. No. 13/269,143 (12 pp).

(Continued)

*Primary Examiner* — Geoffrey L Knable
(74) *Attorney, Agent, or Firm* — Westerman, Hattori, Daniels & Adrian, LLP

(57) ABSTRACT

The invention enables a built band (B) in a cylindrical shape to be easily and surely detached by peeling off the band (B) from being brought into close contact with a drum peripheral face in an expandable and contractable band building drum (D) constituted by two kinds of pluralities of segments (1a)(1b) arranged alternately in a peripheral direction, a diameter of one segment (1a) of two kinds of segments (1a)(1b) is contracted, thereafter, the segment (1a) is temporarily returned to a diameter expanding state, a diameter of other segment (1b) is contracted, thereby, the band (B) is peeled off from being brought into close contact with the drum outer peripheral face, thereafter, the band (B) is detached by bringing both of the segments (1a)(1b) into a diameter contracting state.

4 Claims, 6 Drawing Sheets

(56) References Cited

U.S. PATENT DOCUMENTS

| | | | | |
|---|---|---|---|---|
| 4,010,059 A | * | 3/1977 | Yabe | 156/420 |
| 4,468,267 A | * | 8/1984 | Irie | 156/132 |
| 5,269,870 A | * | 12/1993 | Mori | 156/420 |
| 5,285,947 A | | 2/1994 | Depperman | |
| 5,460,685 A | * | 10/1995 | Siegenthaler | 156/420 |

OTHER PUBLICATIONS

Final Office Action dated Dec. 26, 2012 in copending U.S. Appl. No. 13/269,143 (8 pp).

U.S. Office Action dated Mar. 21, 2014, issued in U.S. Appl. No. 13/269,143.

* cited by examiner

BAND DETACHING METHOD IN BAND BUILDING DRUM AND BAND BUILDING DRUM

TECHNICAL FIELD

The present invention relates to a band detaching method in a band building drum for building a band in a shape of a circular cylinder of mainly a carcass band for a tire or the like for peeling off the built band from being brought into close contact with a drum peripheral face to be detached therefrom, and a band building drum therefor.

BACKGROUND ART

In a background art, in a building step in fabricating a tire, as a tire constituting member, there is built a carcass band in a shape of a circular cylinder by pasting and laminating, for example, a carcass ply constituting a reinforcement member including an inner liner, a rubber chafer and a cord comprising a rubber material on a peripheral face of a building drum.

A band building drum used in building such a cylindrical band is an expandable/contractable drum constituted by a number of segments plurally divided in a peripheral direction, and in building a band, the respective segments are held in a state of expanding a diameter thereof, the respective members are built by being pasted and laminated on the drum peripheral face. Further, in taking out the built cylindrical band to transfer to a next step, by contracting the diameter of the respective segments of the band building drum in a state of grabbing the band from an outer periphery thereof by grabbing means of a transfer apparatus, the band is detached by peeling off the band from being brought into close contact with the drum peripheral face (for example, JP-A-2003-89158).

Normally, the respective segments constituting the band building drum are supported to respectively carry out diameter expanding and diameter contracting operations, as an example thereof, respective pluralities of two kinds of segments having a time difference therebetween in a diameter contracting operation are constituted to be arranged alternately in a peripheral direction, in taking out the built band, first, one segments are contracted in a diameter (other segments are brought into a diameter expanding state), next, other segments are contracted in a diameter (JP-A-11-151763).

Meanwhile, according to a carcass band to be built, the innermost layer is constituted by a rubber member of an inner liner or the like, and is strongly pressed to a drum peripheral face by a stitcher after pasting a carcass ply, and therefore, an inner peripheral face of the band is brought into close contact with outer side faces of the respective segments, and are not peeled off by only providing the time difference in the diameter contracting operation as described above, there is a case in which a portion thereof as brought into close contact therewith remains, and the band cannot easily be detached.

That is, when the one segments are operated to contract the diameter, the other segments are brought into the diameter expanding state, since the band is supported from the inner side by the segments, the band can be peeled off from being brought into close contact therewith, however, when the other segments are operated to contract the diameter, the band is grabbed from the outer periphery by the grabbing means of the transfer apparatus and is not supported from the inner side. Therefore, the band brought into close contact with the outer side faces of the other segments are not easily peeled off, and there is a concern that the band is pulled to the inner side to deform in accordance with operation of contracting the diameter of the segments, which constitutes a hindrance in a case of automating to take out and transfer the built band.

According to an apparatus shown in JP-A-11-151763 mentioned above, in order to deal with shrinkage of the band per se after building, in a state of contracting the diameter of the one segments in two kinds of the segments, a clamp claw provided to the transfer apparatus is inserted to between the one segments and the inner peripheral face of the band, the band is supported from the inner side, and the other segments are operated to contract the diameter.

However, in this case, a special apparatus having the clamp claw is needed for the transfer apparatus of the band, not only a transfer apparatus having a general purpose performance of only sucking and grabbing the band from an outer periphery thereof cannot be used, but an operation of inserting the clamp claw is needed between operations of contracting the diameter of two kinds of the respective segments, further, there is also a concern of damaging a side end portion of the band by the clamp claw, and a smooth taking out operation cannot be carried out.

Further, although in order to prevent the band from being brought into contact with the band building drum, it is conceivable to subject the drum peripheral face to a working treatment for preventing the close contact, or adopt means for blowing air to peel off the band from being brought into close contact therewith, it is not sufficiently satisfactory in view of a peeling effect.

Patent Reference 1: JP-A-2003-89158
Patent Reference 2: JP-A-11-151763

DISCLOSURE OF THE INVENTION

Problems that the Invention is to Solve

The invention has been carried out in view of the above-described problem and provides a band detaching method capable of peeling off a band from being brought into close contact with a drum peripheral face and easily and surely detaching the band therefrom by devising an operation of contracting a diameter of respective segments when a band in a shape of a circular cylinder built by being pasted and laminated on a band building drum is detached from a drum outer peripheral face, and provides a band building drum improved to be able to carry out a unique diameter contracting operation.

Means for Solving the Problems

A band detaching method in a band building drum of the invention resolving the above-described problem is characterized in that in an expandable and contractable band building drum constituted by segments plurally formed separately in a peripheral direction, when a band in a shape of a circular cylinder is built by bringing the respective segments into a diameter expanding state and the built band is taken out, thereafter, by contracting a diameter of a first segment of two kinds of the segments arranged alternately in the peripheral direction, thereafter, temporarily returning the first segment to a diameter expanding state, and contracting a diameter of other second segment, the band is peeled off from being brought into close contact with a drum outer peripheral face, thereafter, the band is detached by bringing both of the first and the second segments into a diameter contracting state.

According to the drum diameter contracting method for taking out the band of the invention, when the diameter of the first segment of one of the two kinds is contracted first, other second segment is brought into the diameter expanding state and the band is supported from an inner side, and therefore, the band inner peripheral face brought into close contact with the first segment can surely be peeled off. Further, when the diameter of the second segment is contracted, the first segment is brought into the diameter expanding state to support the band from the inner side, and therefore, the band inner peripheral face can surely be peeled off from being brought into close contact with the second segment. That is, an entire face of the band brought into close contact with the drum outer peripheral face can surely be peeled off, and the built band can easily be detached from the band building drum. Further, the band is facilitated to be transferred to a next step by a transfer apparatus of sucking the built band from the outer periphery to hold.

A band building drum of the invention used in the band detaching method is an expandable and contractable band building drum characterized by including two kinds of first and second segments plurally formed separately in a peripheral direction and arranged alternately in the peripheral direction, wherein the first and second respective segments are respectively guided to permit expanding and contracting movements in a diameter direction and restrict movements in an axial direction by guide means relative to a drum shaft, the first segment is connected to and supported by first expanding/contracting means provided on the drum shaft and the second segment is connected to and supported by second expanding/contracting means, respectively, and the first expanding/contracting means and the second expanding/contracting means are individually controlled to operate, in detaching a band after having been built, the first segment is operated to contract a diameter, thereafter, temporarily returns to an original diameter expanding state, next, the second segment is operated to contract a diameter, thereafter, the first and the second respective segments are controlled to operate to be brought into a diameter contracting state. By the band building drum, the invention of the band detaching method can be carried out excellently without a problem.

The first and the second expanding/contracting means utilizing a movement in the axial direction by a cylinder mechanism on the drum shaft and a link mechanism facilitate an operation control for expanding/contracting operations, which is particularly preferable.

The band building drum is characterized in including a first and a second cylinder mechanism respectively including a first and a second cylinder maintaining an airtight state relative to the drum shaft and slidable in the axial direction, and a first and a second piston portion respectively fixed to the drum shaft in the two cylinders respectively at an outer peripheral portion of the drum shaft, wherein the two cylinders are constituted to move to slide respectively in the axial direction by operations of charging and discharging air to and from spaces in the two cylinders on both sides in the axial direction of the respective piston portions, as the first and second expanding/contracting means, the first segment and the second segment are connected to the first cylinder and the second cylinder respectively by way of link members, and provided to operate to expand and contract by moving the cylinders in the axial direction. Thereby, the band detaching method of the invention is facilitated to carry out.

Further, in the band building drum, it is preferable that a connection fulcrum of the link member connected to the second segment with the second cylinder is disposed on an inner side of a connection fulcrum of the link member connected to the first segment with the first cylinder, and the second segment is provided to be able to contract the diameter to a position at which the diameter of the second segment is smaller than the diameter of the first segment. Thereby, the diameters of the first and the second segments can be contracted in the state of providing the stepped difference therebetween.

Advantage Of The Invention

According to the band detaching method in the band building drum of the invention, by operating to contract the diameters of two kinds of the respective pluralities of segments constituting the band building drum alternately in a state of holding other in the diameter expanding state, an entire face of the inner peripheral face of the built band can easily and surely be peeled off from being brought into close contact with the outer peripheral faces of the respective segments of the band building drum, and the band can be detached from the band building drum easily and without a concern of bringing about a deformation.

Therefore, in building, for example, a tire, an operation of taking out the built cylindrical band from the band building drum to transfer to a next step can be made efficient, and is facilitated to automate, which contributes to an increase in a tire building efficiency.

BEST MODE FOR CARRYING OUT THE INVENTION

Next, an embodiment of the invention will be explained based on an example shown in the drawings.

FIG. 1 is a vertical sectional view showing an example of a band building drum of the invention, FIG. 2 is a vertical sectional view of a diameter contracting state of the same, FIG. 3 and FIG. 4 are sectional views taken along a line III-III and a line IV-IV of FIG. 1, FIG. 5A, FIG. 5B, FIG. 5C and FIG. 5D are explanatory views showing a state of operating to expand and contract two first and second segments.

A band building drum D of an illustrated example is a drum used for building a carcass band in a building step of a tire, as shown by FIG. 3 and FIG. 4, a drum main body 1 in a shape of a circular cylinder is constituted by respective pluralities of two kinds of first and second segments 1a, 1b formed plurally to be divided separately in a peripheral direction, and the first segments 1a and the second segments 1b are arranged alternately in the peripheral direction and constituted to be expandable and contractable. Numeral 2 designates a drum shaft.

The first segment 1a and the second segment 1b are respectively guided by guide means 3a, 3b in a diameter direction provided on the drum shaft 2 to permit expanding and contracting movements in the diameter direction and restrict a movement in an axial direction, the first segment 1a is connected to first expanding/contracting means 10a provided on the drum shaft 2 on an inner side of the drum to be supported expandably and contractably, and the second segment 1b is connected to second expanding/contracting means 10b to be supported expandably and contractably, respectively. Notation 4a, 4b designate reinforcement members attached to inner side faces of the respective segments 1a, 1b.

In the case of the drawings, the first expanding/contracting means 10a and the second expanding/contracting means 10b are constituted to utilize a first cylinder mechanism 11a and a second cylinder mechanism 11b aligned at an outer peripheral portion of the drum shaft 2 on the inner side of the drum to be spaced apart from each other in the axial direction.

The first and the second cylinder mechanisms 11a, 11b are constituted by including a first and a second cylinders 12a and 12b respectively slidable in the axial direction relative to the drum shaft 2 by maintaining an airtight state, and a first and a second piston portions 13a and 13b respectively fixed to the drum shaft 2 in the two cylinders 12a and 12b, and the two cylinders 12a, 12b are constituted to slide to move respectively in the axial direction by an operation of charging and discharging air or the like to and from inner spaces of the two cylinders 12a, 12b, particularly, spaces 14a1, 14a2;14b1, 14b2 on both sides in the axial direction of the piston portions 13a, 13b.

For example, FIG. 1 shows a state of charging air to the space 14a2 on the right side of the first piston portion 13a in the drawing and the space 14b1 on the left side of the second piston portion 13b in the drawing (spaces 14a1 and 14b2 are brought into an air discharging state), conversely to the above-described, FIG. 2 shows a state in which air is charged to the space 14a1 on the left side of the piston portion 13a in the drawing, and the space 14b2 on the right side of the piston portion 13b in the drawing (air is discharged from spaces 14a2 and 14b1), and the first and the second cylinders 12a and 12b are respectively moved in the axial direction.

Air is charged and discharged to and from the respective spaces 14a1, 14a2;14b1, 14b2 by way of charging/discharging paths 15a1, 15a2;15b1, 15b2 provided at inside of the drum shaft 2 and communicating with the respective spaces. The respective charging/discharging paths 15a1, 15a2;15b1, 15b2 are respectively individually connected to charging/discharging means (not illustrated) of blowers or the like, and respective charging/discharging operations are controlled in accordance with expanding/contracting operations of the drum mentioned later.

The first respective segments 1a and the second respective segments 1b are connected to the first cylinder 12a and the second cylinder 12b by way of a first and a second link members 5a and 5b at two portions spaced apart from each other in the drum shaft direction, and supported to carry out expanding/contracting operations by changes in inclinations of the link members 5a and 5b by moving the respective cylinders 12a and 12b in the axial direction, that is, by a change in an angle between an erected state of FIG. 1 and an inclining state of FIG. 2 relative to the drum shaft 2.

In the case of the drawings, the first cylinder 12a is extended with a cylinder portion 16a slidably fitted to an outer periphery of the cylinder 12b at an end portion thereof on a side opposed to the second cylinder 12b, one end of the first link member 5a is connected to the cylinder portion 16a by a pin pivotably in the axial direction, and other end thereof is connected to an inner side face of the first segment 1a by a pin. Further, both ends of the second cylinder 12b are extended with cylinder portions 16b, 16b having a diameter smaller than a cylinder diameter respectively slidably fitted to the drum shaft 2, one ends of the second link members 5b are connected to the cylinder portions 16b, 16b by pins pivotably in the axial direction, and other ends thereof are connected to an inner side face of the second segment 1b by pins.

That is, a pin connection position on the side of the cylinder mechanism 11a of the first link member 5a, that is, a connection fulcrum 6a with the cylinder 12a is disposed on an outer side of the cylinder diameter, further, a pin connection position on the side of the cylinder mechanism 11b of the second link member 5b, that is, a connection fulcrum 6b with the cylinder 12b is disposed on an inner side of the cylinder diameter, and a link length of the link member 5a is made to be longer than that of the first link member 5a. Thereby, the second segment 1b connected to the second link member 5b is constituted to be able to contract the diameter to a position at which the diameter is smaller than that of the first segment 1a.

Further, the second link member 5b is connected inclinably to both of the second segment 1 and the second cylinder 11a by a pin by way of a notch 17a formed at the cylinder portion 16a.

Further, the cylinder mechanisms 11a, 11b constituting the first expanding/contracting means 10a and the second expanding/contracting means 10b are constituted such that respective movements in the axial direction of the cylinders 12a, 12b, that is, operations of charging and discharging air or the like to and from the spaces 14a1, 14a2;14b1, 14b2 are respectively individually controlled, in detaching a band after building, one of two kinds of the first and the second segments 1a, 1b, for example, the first segment 1a connected to the link member 5a having the shorter link length is operated to contract the diameter, thereafter, temporarily returns to the original diameter expanding state, next, the second segment 1b connected to the link member 5b having the longer link length is operated to contract the diameter, thereafter, the first segment 1a is operated to contract the diameter again to set both of the first and the second respective segments 1a, 1b to be brought into the diameter contract state, and an operation thereof can be controlled.

The band building drum D having the above-described constitution is fastened to a main shaft 8 of a support portion 7 including rotation driving means (not illustrated) of a motor or the like at one end portion 21 of the drum shaft 2 by bolt fastening means and is used for building, for example, a cylindrical band of a carcass band or the like in tire building.

First, in building the cylindrical band, the two kinds of the first and the second respective segments 1a, 1b are made to expand the diameters to constitute an outer peripheral face of the same circle respectively by the first and the second expanding/contracting means 10a, 10b to be held in states of FIG. 1 and FIG. 5A. That is, by making the cylinder 12a of the first cylinder mechanism 11a constituting the first expanding/contracting means 10a disposed on the right side of FIG. 1 and making the cylinder 12b of the cylinder mechanism 11b constituting the second expanding/contracting means 10b disposed on the left side of FIG. 1, the first and the second link members 5a, 5b can be held in a state of being erected relative to the drum shaft 2, and the both respective segments 1a, 1b can be held in the diameter expanding state. Thereby, a band B having a predetermined inner diameter and constituting the cylindrical shape can be built.

Further, in the detaching method of the invention of taking out the band B in the cylindrical shape built as described above from the band building drum D, for example, the band B is brought into a state of being grabbed from the outer periphery by grabbing means of a transfer apparatus to a next step, first, the diameter of one of the first and the second segments 1a, 1b, for example, the first segment 1a is contracted as shown by FIG. 5B by operating the expanding/contracting means 10a. That is, the cylinder 12a of the cylinder mechanism 11a constituting the expanding/contracting means 10a is moved in the axial direction to the left of FIG. 1 by an operation of charging/discharging air to and from the inner spaces 14a1, 14a2. Thereby, the diameter of the first segment 1a connected to the cylinder 12a by way of the first link member 5a is contracted as shown by FIG. 5B.

At this occasion, the other second segment 1b is held to stay in the diameter expanding state, and supports the band B from the inner side, and therefore, a deformation of the band B to the inner side can be restrained, and therefore, an inner peripheral face of the band B can easily be peeled off from being brought into close contact with the first segment 1a.

Next, with regard to the first segment 1a, the first segment 1a is temporarily returned to the original diameter expanding state (that is, states of FIG. 1 and FIG. 5A) by moving the cylinder 12a of the first cylinder mechanism 11a in the axial direction by an operation of charging and discharging air to and from the inner spaces 14a1, 14a2, thereafter, the diameter of the second segment 1b is contracted as shown by FIG. 5C by operating the expanding/contracting means 10b. That is, the cylinder 12b of the cylinder mechanism 11b constituting the expanding/contracting means 10b is moved in the axial direction to the right side of FIG. 1 by the operation of charging and discharging air to and from the inner spaces 14b1, 14b2. Thereby, the diameter of the second segment 1b connected to the cylinder 12b by way of the second link member 5b is contracted as shown by FIG. 5C. At this occasion, the one first segment 1a is held to stay in the diameter expanding state and supports the band B from the inner side, and therefore, the deformation of the band B to the inner side can be restrained, and the inner peripheral face of the band B can easily be peeled off from being brought into close contact with the second segment 1b.

Thereafter, both of the first and the second segments 1a, 1b are brought into a state of contracting the diameters as shown in FIG. 5D. That is, by contracting the diameter of the first segment 1a again in a state of contracting the diameter of the second segment 1b connected to the link member 5b having the longer link length as described above, the diameters of both of the first and the second segments 1a, 1b can be contracted by constituting a stepped difference therebetween as shown by FIG. 5D.

Thereby, the built band B can surely be peeled off from being brought into close contact with the drum outer peripheral face and can be detached easily from the band building drum D. Therefore, in a state of grabbing the band B by the transfer apparatus including means of sucking and grabbing the band B from an outer periphery thereof, the band B can be peeled off from being brought into close contact with the building drum D and can easily be taken out from the building drum D, further, the built band is facilitated to transfer to the next step by the transfer apparatus.

Further, according to the method of detaching the band from the building drum and the band building drum of the invention, an object thereof is applicable not only to the carcass band in building the tire, but to a belt band or a band building drum needing expanding/contracting operations of a first stage building drum or the like.

Industrial Applicability

The invention can preferably be utilized in a case of detaching a built band from a building drum by peeling off the band from being brought into close contact therewith by operations of expanding and contracting the building drum in a band building drum of building a band in a cylindrical shape of a carcass band, a belt band or the like in building a tire.

BRIEF DESCRIPTION OF THE DRAWINGS

FIG. 1 is a vertical sectional view showing an example of a band building drum of the invention.
FIG. 2 is a vertical sectional view of a diameter contracting state of the same.
FIG. 3 is a sectional view taken along a line III-III of FIG. 1.
FIG. 4 is a sectional view taken along a line IV-IV of FIG. 1.

FIG. 5A is an explanatory view showing a state of operating to expand and contract both first and second segments.
FIG. 5B is an explanatory view showing a state of operating to expand and contract the both first and second segments.
FIG. 5C is an explanatory view showing a state of operating to expand and contract the both first and second segments.
FIG. 5D is an explanatory view showing a state of operating to expand and contract the both first and second segments.

Description Of Reference Numerals And Signs

Figure 1:
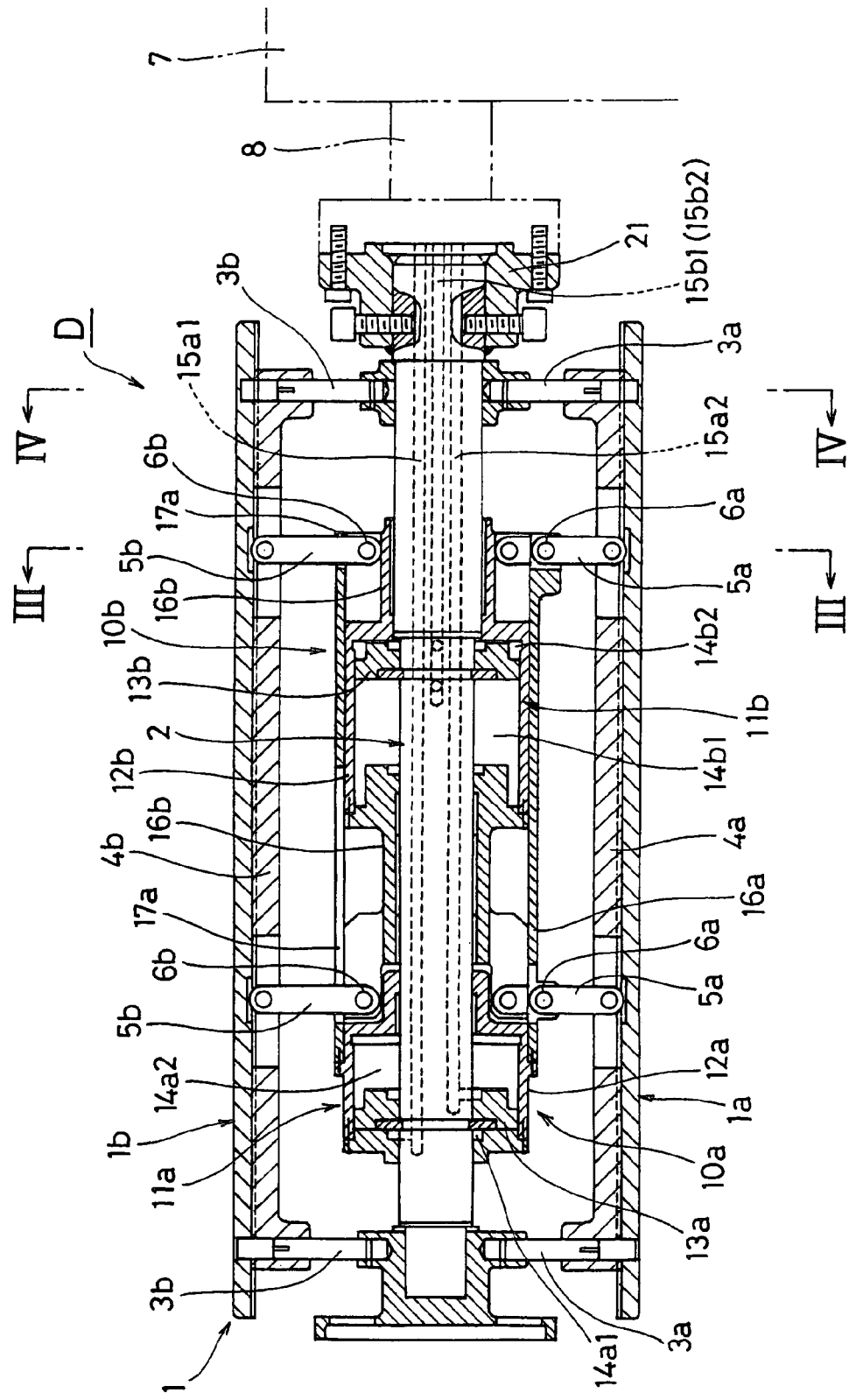
[FIG.1]
Figure 2:
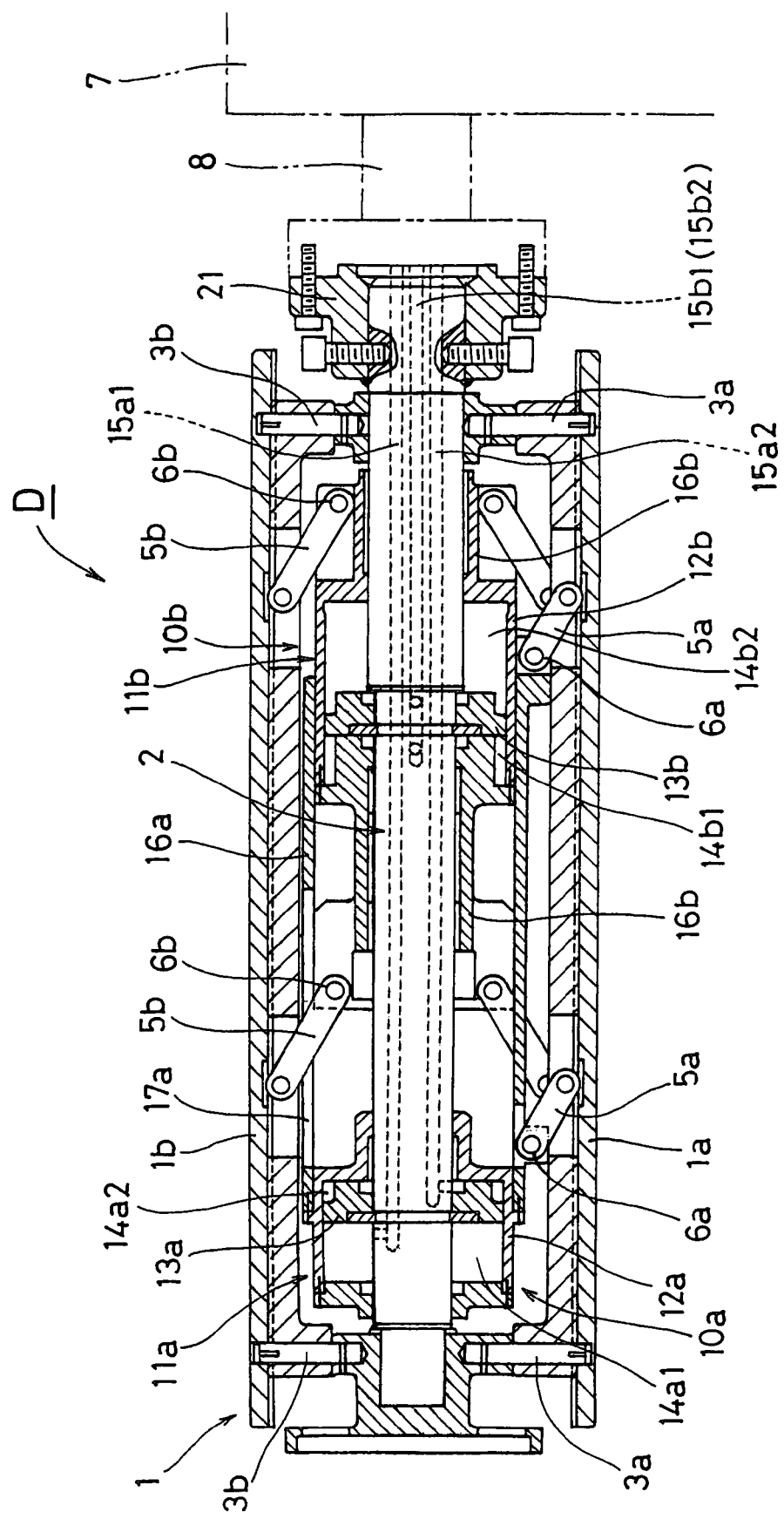
[FIG.2]
Figure 3:
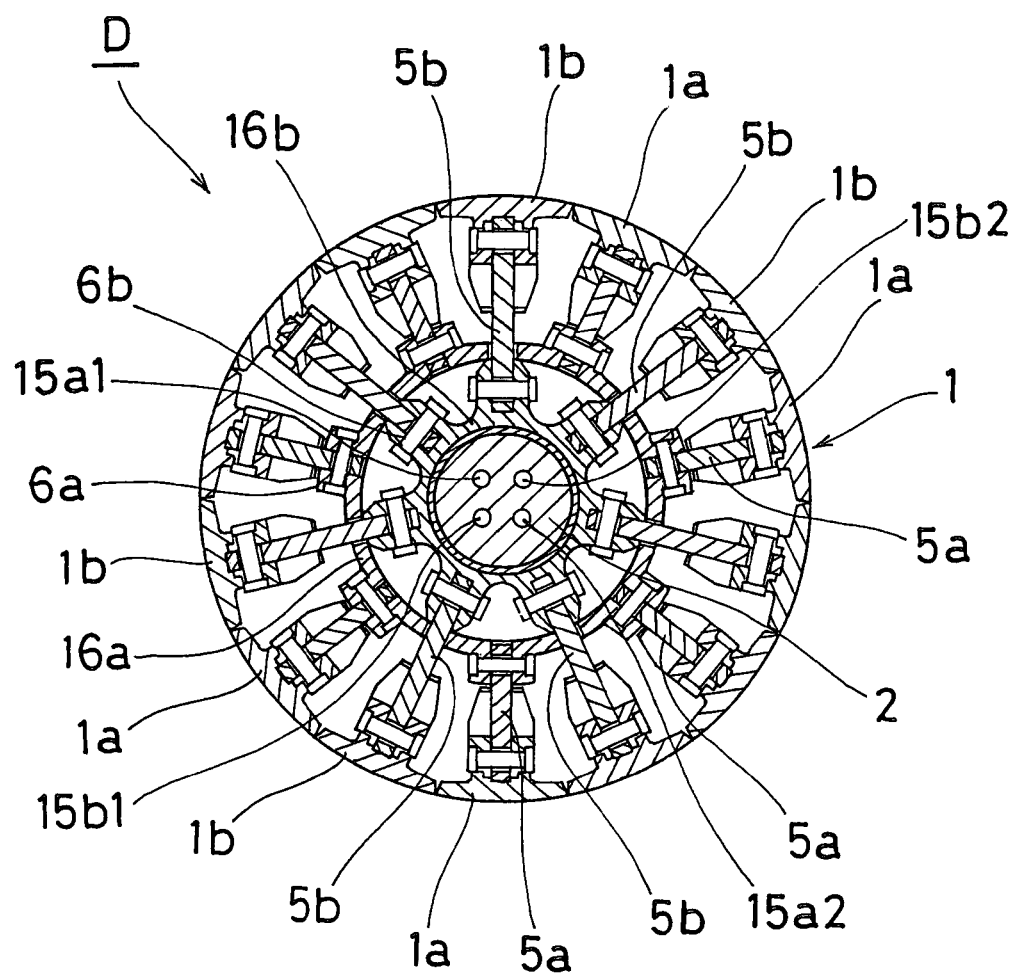
[FIG.3]
Figure 4:
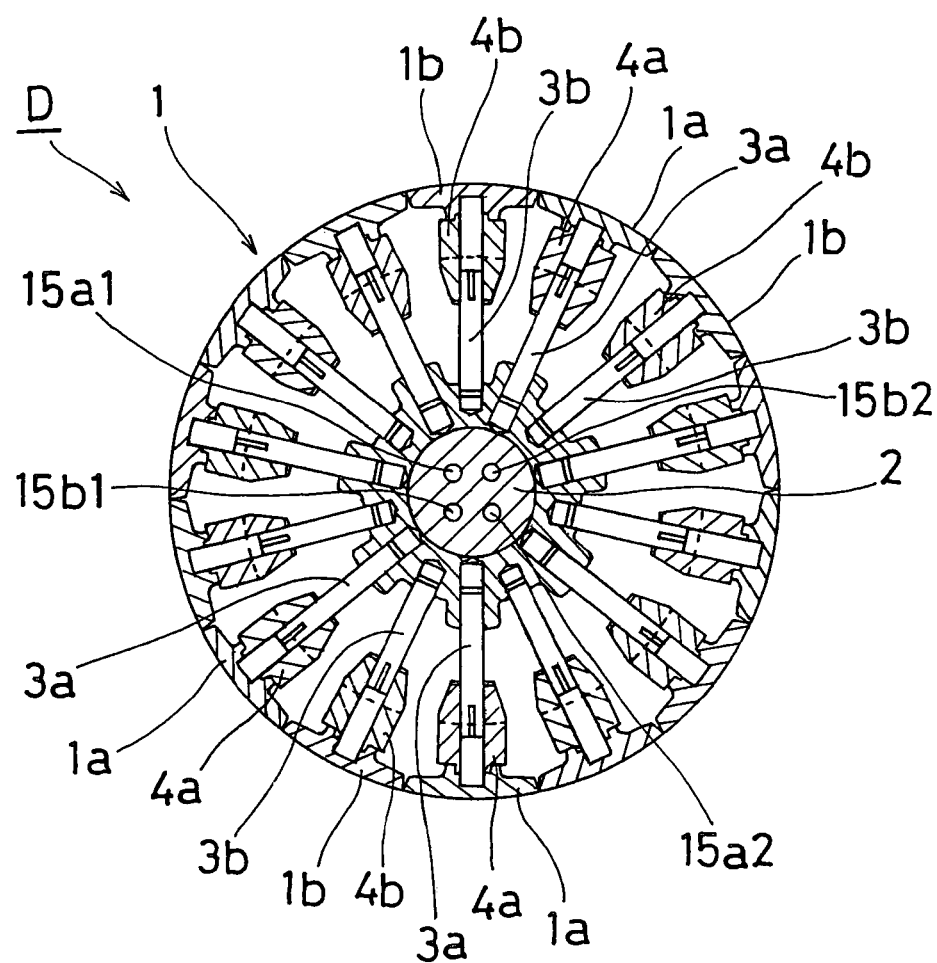
[FIG.4]
Figure 5A:
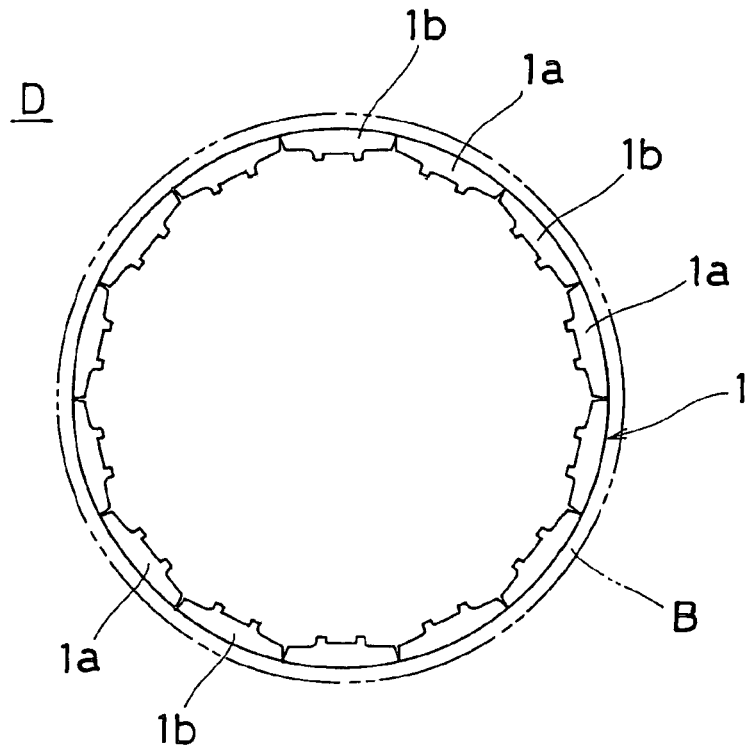
[FIG.5A]
Figure 5B:
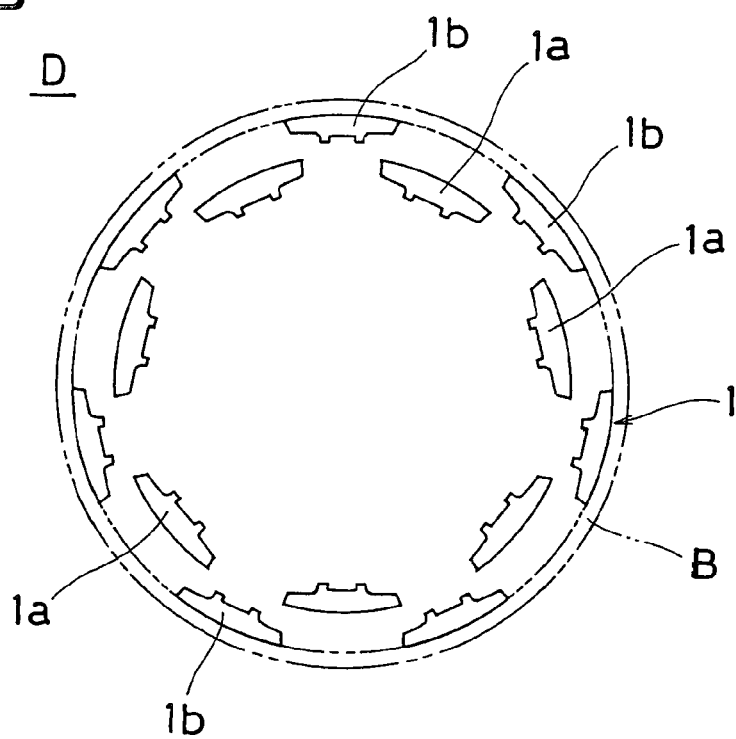
[FIG.5B]
Figure 5C:
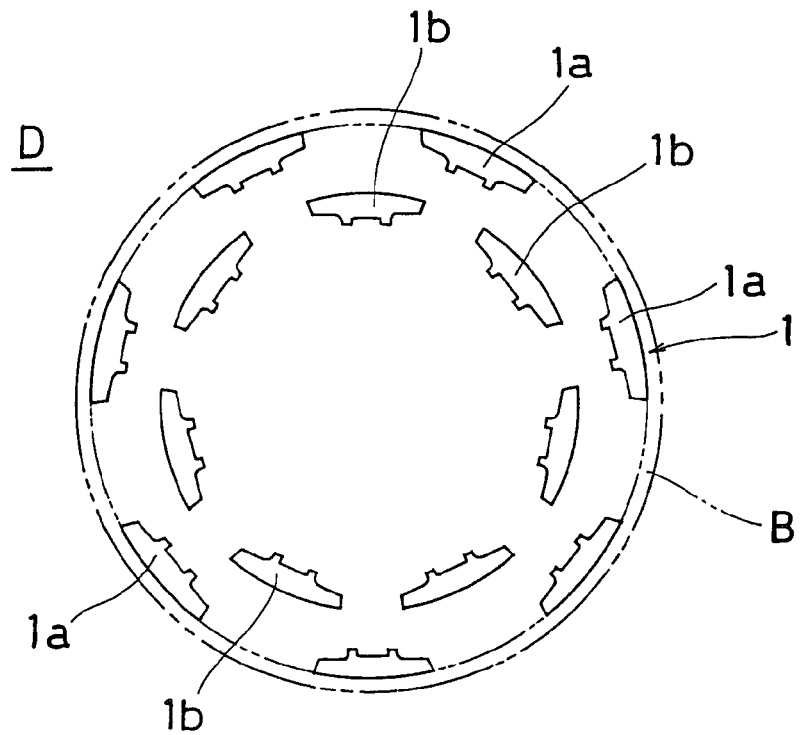
[FIG.5C]
Figure 5D:
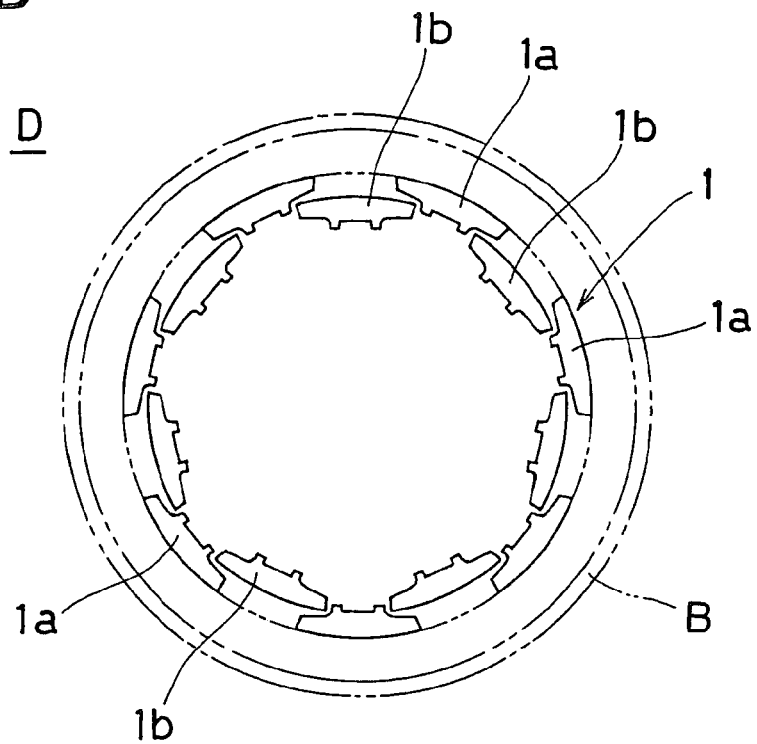
[FIG.5D]

B . . . band in cylindrical shape, D . . . band building drum, 1 . . . drum main body, 1a, 1b . . . first segment and second segment, 2 . . . drum shaft, 3a, 3b . . . guide means, 4a, 4b . . . reinforcement members, 5a, 5b . . . first and second link members, 6a, 6b . . . connection fulcrums with cylinder, 7 . . . support portion, 8 . . . main shaft, 10a, 10b . . . first and second expanding/contracting means, 11a, 11b . . . first and second cylinder mechanisms, 12a, 12b . . . first and second cylinders, 13a, 13b . . . first and second piston portions, 14a1, 14a2;14b1, 14b2 . . . inner spaces of cylinders, 15a1, 15a2; 15b1, 15b2 . . . air charging/discharging paths, 16a, 16b . . . cylinder portions, 17a . . . notch

The invention claimed is:

1. A band detaching method in a band building drum, including an expandable and contractable cylindrically shaped band building drum having a plurality of first segments and a plurality of second segments disposed alternately and circumferentially to form the cylindrical shape of the band building drum, the band detaching method comprising the following steps in order:
   bringing the respective segments into a diametrically expanded state for the band building to be carried out, and after that then;
   building the band around an outer circumferential surface of the expanded segments and after that then;
   diametrically contracting the first segments from the diametrically expanded state while holding the second segments in the diametrically expanded state and after that then;
   temporarily returning the first segments to the diametrically expanded state while holding the second segments in the diametrically expanded state, and then after that diametrically contracting the second segments from the diametrically expanded state while holding the first segments in the diametrically expanded state, so that the band is peeled off from being in close contact with the outer circumferential surface of the segments; and then after that
   detaching the band by bringing both of the first and the second segments into a diametrically contracted state.

2. The band detaching method in a band building drum according to claim 1, wherein both of the first and second segments are brought into the diametrically contracted state by diametrically contracting the second segments, and thereafter, diametrically contracting the first segments again without diametrically expanding the second segments.

3. The band detaching method in a band building drum according to claim 2, and further wherein,
   the band building drum includes first and second cylinders slideable independently in a drum shaft direction, first and second piston portions respectively fixed to a drum shaft in the first and second cylinders, and further wherein the first and second segments are connected to the first and second cylinders respectively by way of link members, and further wherein the first and second segments are expanded and contracted respectively by moving each cylinder independently to slide in the drum shaft direction by charging air and discharging air from inner spaces of the first and second cylinders.

4. The band detaching method in a band building drum according to claim 1, and further wherein, the band building drum includes first and second cylinders slideable independently in a drum shaft direction, first and second piston portions respectively fixed to a drum shaft in the first and second cylinders, and further wherein the first and second segments are connected to the first and second cylinders respectively by way of link members, and further wherein the first and second segments are expanded and contracted respectively by moving each cylinder independently to slide in the drum shaft direction by charging air and discharging air from inner spaces of the first and second cylinders.

* * * * *